(12) United States Patent
Ang et al.

(10) Patent No.: US 7,233,189 B1
(45) Date of Patent: Jun. 19, 2007

(54) SIGNAL PROPAGATION CIRCUITRY FOR USE ON INTEGRATED CIRCUITS

(75) Inventors: Boon Jin Ang, Penang (MY); Thow Pang Chong, Johor (MY)

(73) Assignee: Altera Corporation, San Jose, CA (US)

(*) Notice: Subject to any disclaimer, the term of this patent is extended or adjusted under 35 U.S.C. 154(b) by 202 days.

(21) Appl. No.: 10/996,592

(22) Filed: Nov. 24, 2004

(51) Int. Cl.
*H03K 3/00* (2006.01)
*G06F 17/50* (2006.01)

(52) U.S. Cl. .......................... 327/293; 327/297; 716/5; 326/93

(58) Field of Classification Search ................ 327/293, 327/297; 326/93
See application file for complete search history.

(56) References Cited

U.S. PATENT DOCUMENTS 5,923,188 A * 7/1999 Kametani et al. ............. 326/93
6,204,713 B1 * 3/2001 Adams et al. ............... 327/295
6,205,572 B1 * 3/2001 Dupenloup ..................... 716/5
6,313,683 B1 * 11/2001 Block et al. ................. 327/295
6,397,374 B1 * 5/2002 Pasqualini ..................... 716/8
6,542,005 B2 * 4/2003 Yamamoto ..................... 326/93
6,724,231 B2 * 4/2004 Yoshikawa ................... 327/291
6,807,660 B1 * 10/2004 Frenkil ........................... 716/6

OTHER PUBLICATIONS

U.S. Appl. No. 10/113,328, filed Mar. 29, 2002, Park.

* cited by examiner

*Primary Examiner*—Vibol Tan
(74) *Attorney, Agent, or Firm*—Fish & Neave IP Group of Ropes & Gray LLP; Robert R. Jackson

(57) ABSTRACT

Signal transmission circuitry on an integrated circuit ameliorates the effects of possible inequality in rise and fall times of buffer circuits along the transmission circuitry by providing at least one of the buffer circuits as an inverting buffer circuit and at least one other of the buffer circuits as a non-inverting buffer circuit. The invention may be of particular interest for use in clock signal distribution networks on integrated circuits such as programmable logic devices.

7 Claims, 5 Drawing Sheets

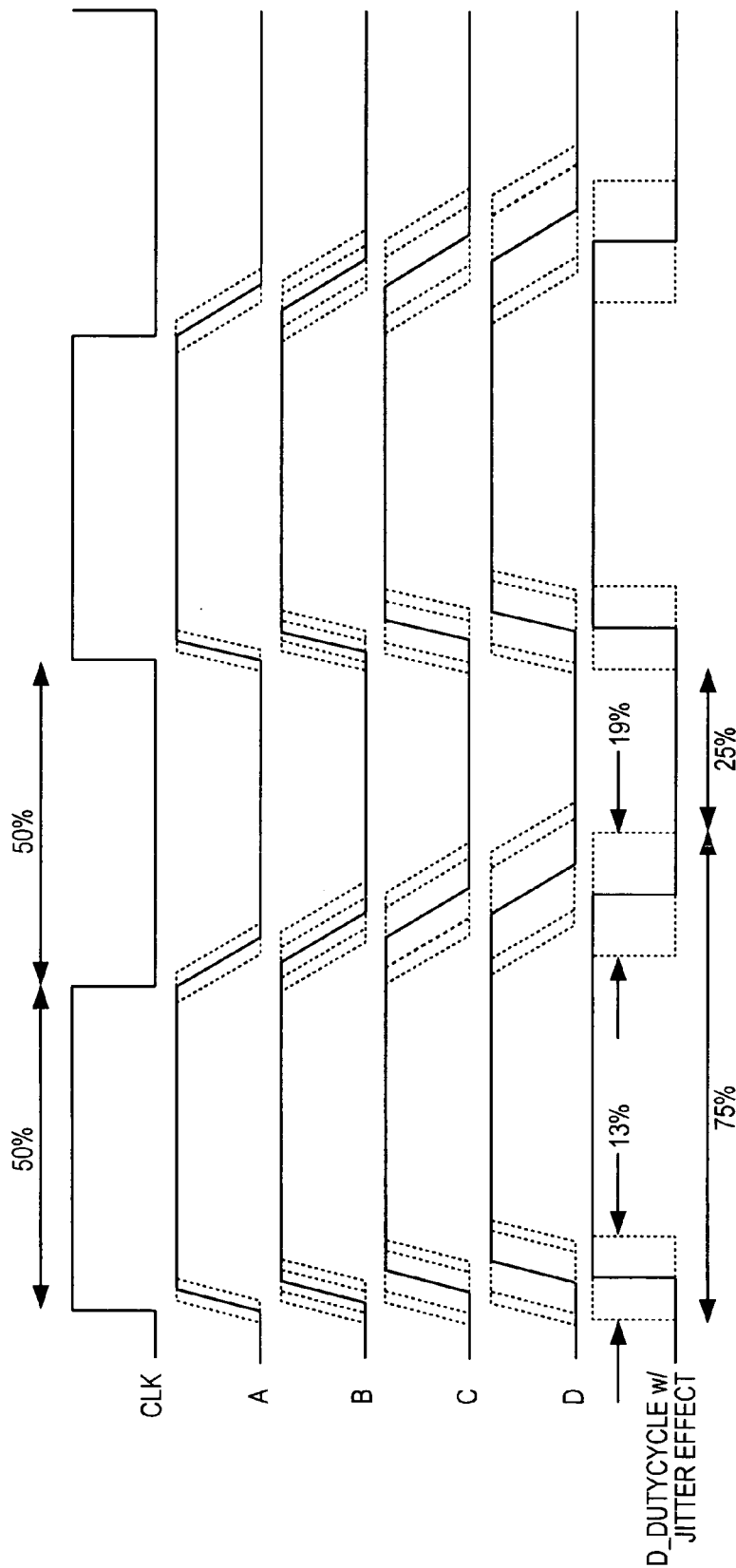

US 7,233,189 B1

SIGNAL PROPAGATION CIRCUITRY FOR USE ON INTEGRATED CIRCUITS

BACKGROUND OF THE INVENTION

This invention relates to integrated circuits, and more particularly to circuitry for buffering signals propagating on an integrated circuit.

Some integrated circuits ("ICs") must include circuitry for propagating a signal a relatively long distance on the IC and/or distributing the signal to multiple destinations throughout the IC. An example of this is a clock signal on a programmable logic device IC ("PLD"). In order for a signal to travel a long distance and/or to multiple destinations on the IC without undesirable loss of signal strength, the signal may need to be buffered at several locations along the circuitry that conveys it. IC fabrication process variations or other similar effects may cause buffers that are intended to operate identically from one IC to the next to in fact differ in performance. For example, it may be intended for the buffers on an IC to have rise and fall times ("Tr" and "Tf", respectively) that are equal. In actual practice, however, on some of the ICs Tr may be greater that Tf, while on others of the ICs Tf may be greater than Tr. Especially for a signal that must pass successively through several buffers, this can have any of several undesirable consequences. If the signal is a clock signal, for example, the duty cycle of the signal can be undesirably altered and/or worst-case jitter can become undesirably large.

SUMMARY OF THE INVENTION

To ameliorate the effects of different rise and fall times for the buffers along a signal transmission or distribution network in an integrated circuit, at least one of those buffers is provided as an inverting buffer, and at least one other of the buffers is provided as a non-inverting buffer. If a signal must pass successively through more than two buffers in such a network, the inverting and non-inverting buffers may alternate with one another along the network. A clock signal transmission or distribution network is an example of circuitry to which the invention may be advantageously applied.

In the case of a network that includes a tree of conductor segments emanating from a source location and progressively branching and rebranching from one another at branching locations that are progressively more distant from the source location along the tree, buffer circuitry is preferably connected into the tree adjacent at least some of the branching locations for strengthening a signal passing through the buffer circuitry. At least some of this buffer circuitry inverts the signal passing through it, and at least some other of the buffer circuitry does not invert the signal passing through it.

Further features of the invention, its nature and various advantages will be more apparent from the accompanying drawings and the following detailed description.

BRIEF DESCRIPTION OF THE DRAWINGS

FIG. 3 shows a plurality of simplified waveforms of illustrative signals at various points in the FIG. 1 circuitry.

DETAILED DESCRIPTION

Figure 1:
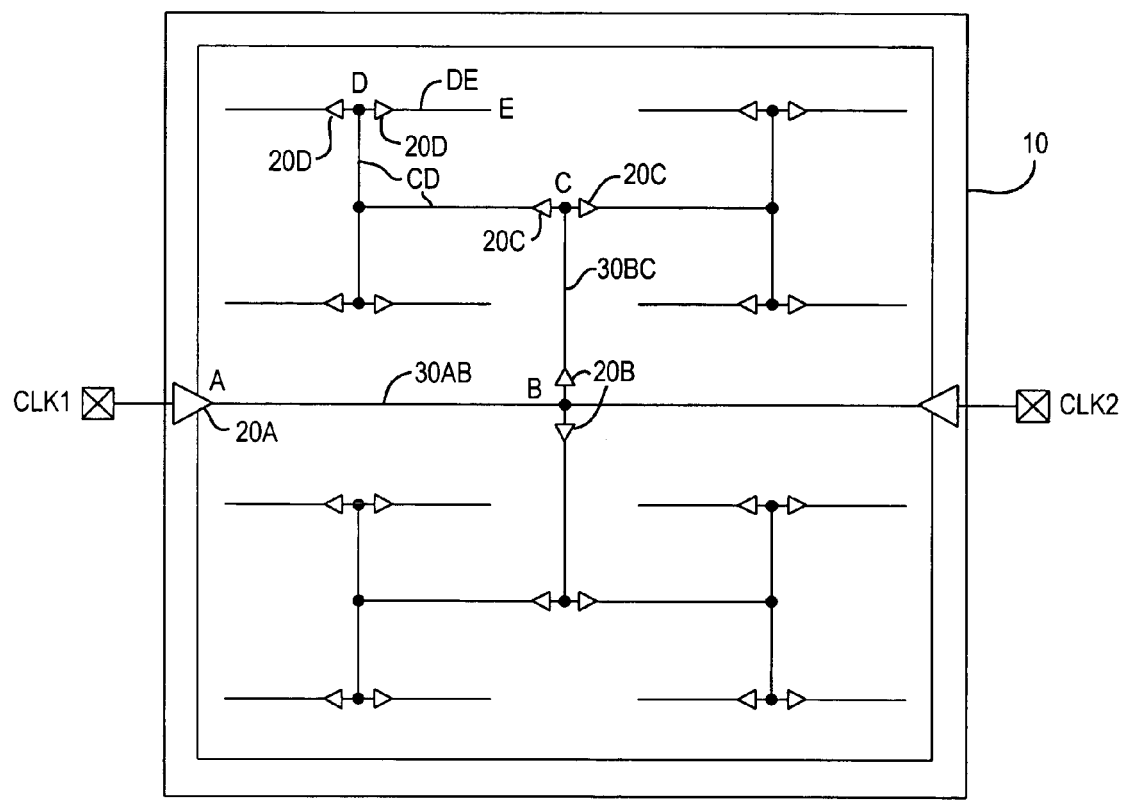
FIG. 1 is a simplified schematic block diagram of illustrative prior art circuitry that can be modified in accordance with the invention.

FIG. 1 shows an illustrative IC 10 (e.g., a PLD) having a network for distributing a clock signal to many locations throughout the IC. Although the invention will be described for the most part with reference to such a clock signal distribution network, it will be understood that the invention is not limited to clock signals or to networks having any particular configuration or architecture. Rather, the invention is equally applicable to many types of signals that require repeated buffering on an IC and to any network configuration including such repeated buffering.

Continuing with the example shown in FIG. 1, a clock signal may be applied to IC 10 via input buffer 20A at location A. Buffer 20A strengthens the clock signal and passes it on (via conductor segment 30AB) to buffers 20B at location B. Each of buffers 20B strengthens the clock signal again and passes it on (via a conductor segment 30BC) to buffers 20C at a respective one of locations C. Each of buffers 20C strengthens the signal yet again and passes it on (via a conductor segment 30CD) to buffers 20D at a respective one of locations D. Each of buffers 20D strengthens the signal once more and passes it on (via a conductor segment 30DE) to circuitry that uses the signal (e.g., at a location like E).

Figure 2:
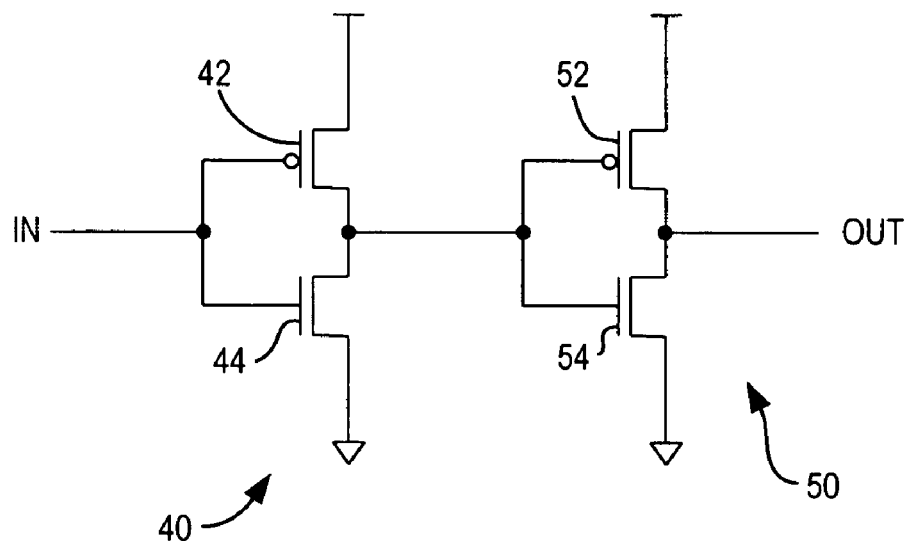
FIG. 2 is a schematic diagram of an illustrative embodiment of a representative portion of the FIG. 1 (or FIG. 4) circuitry.

A typical construction for each of buffers 20 in prior art circuitry like that shown in FIG. 1 is shown in FIG. 2. This type of buffer is basically two, serially connected, CMOS inverters 40 and 50. Inverter 40 includes PMOS transistor 42 and NMOS transistor 44 connected in series between VCC and ground. Inverter 50 includes PMOS transistor 52 and NMOS transistor 54 connected in series between VCC and ground. Inverter 40 inverts the input signal it receives and outputs the inverted signal to inverter 50. Inverter 50 inverts that signal again to produce the final buffer output signal. Because buffer 20 thus has an even number of serially connected inverter stages, buffer 20 is, overall, a non-inverting buffer.

A typical objective in designing ICs like IC 10 in FIG. 1 is for the rise and fall times (Tr and Tf, respectively) of buffers 20 (implemented, e.g., as in FIG. 2) to be substantially equal. IC fabrication process variations may, however, cause some ICs that are produced to have unequal Tr and Tf. On some such ICs Tr may be greater than Tf. On other such ICs Tf may be greater than Tr.

FIG. 3 illustrates effects of unequal Tr and Tf in the representative case in which Tf is greater than Tr. FIG. 3 assumes that each buffer is triggered to begin a transition when the upstream signal is at 0.5VCC. FIG. 3 ignores possible transmission delay along the conductor segments of the network. The information shown in solid lines in FIG. 3 will be discussed first, then the dashed lines (jitter) will be discussed.

The CLK line in FIG. 3 shows the input clock signal in FIG. 1. This signal is assumed (as shown) to have a 50% duty cycle. The A line in FIG. 3 shows the clock signal as output by a buffer 20A in FIG. 1. The B–D lines in FIG. 3 show the clock signal as output (successively and respectively) by buffers 20B–20D. The last line in FIG. 3 shows an idealized clock signal from final buffer 20D. As FIG. 3 shows, because Tf is greater than Tr, each successive buffering of the clock signal causes the duration of the high phase of the resulting signal to increase somewhat relative to the duration of the low phase. This gradually changes the duty cycle of the signal from 50% to something significantly more than 50% (i.e., from 50/50 to about 75/25 in the particular example shown in FIG. 3). This penalizes setup/hold time for designs that use both rise and fall clock edges. In addition, if this clock is used to generate an output clock through regular input/output ("IO") (e.g., like DDR DQS output or LVDS clock output using soft-DDIO), this change in duty cycle impacts the overall system setup/hold time margins.

In addition to the solid line effects shown in FIG. 3 and described above, more rapid transitions tend to have and/or cause less jitter than slower transitions do. In the example shown in FIG. 3 (in which Tr is less than Tf), the dashed lines (which represent jitter) show jitter accumulating as the signal passes through successive buffers A–D. More jitter accumulates for falling edges than for rising edges because in this example Tr is less than Tf. In the particular example shown in FIG. 3 the clock-rise jitter accumulates to 13% of the clock period, and the clock-fall jitter accumulates to 19% of the clock period. This difference in jitter contributes to further degradation of the clock duty cycle. In a PLD each functional block typically supports programmable invert for the clock input to that block. A PLD fitter can therefore use either clock edge to fit the desired clock edge. But the fitter has to work with the worst case jitter during timing analysis. Assuming that FIG. 3 illustrates a worst case condition, the fitter would have to assume that jitter can be as much as 19% of the clock period.

Figure 5:
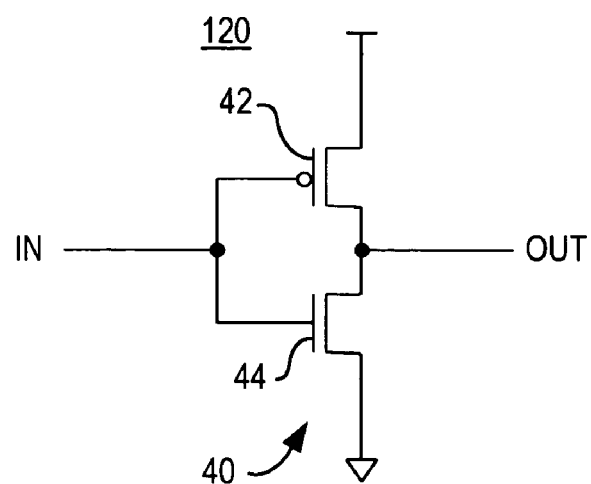
FIG. 5 is a schematic diagram of an illustrative embodiment of a representative portion of the FIG. 4 circuitry.
Figure 4:
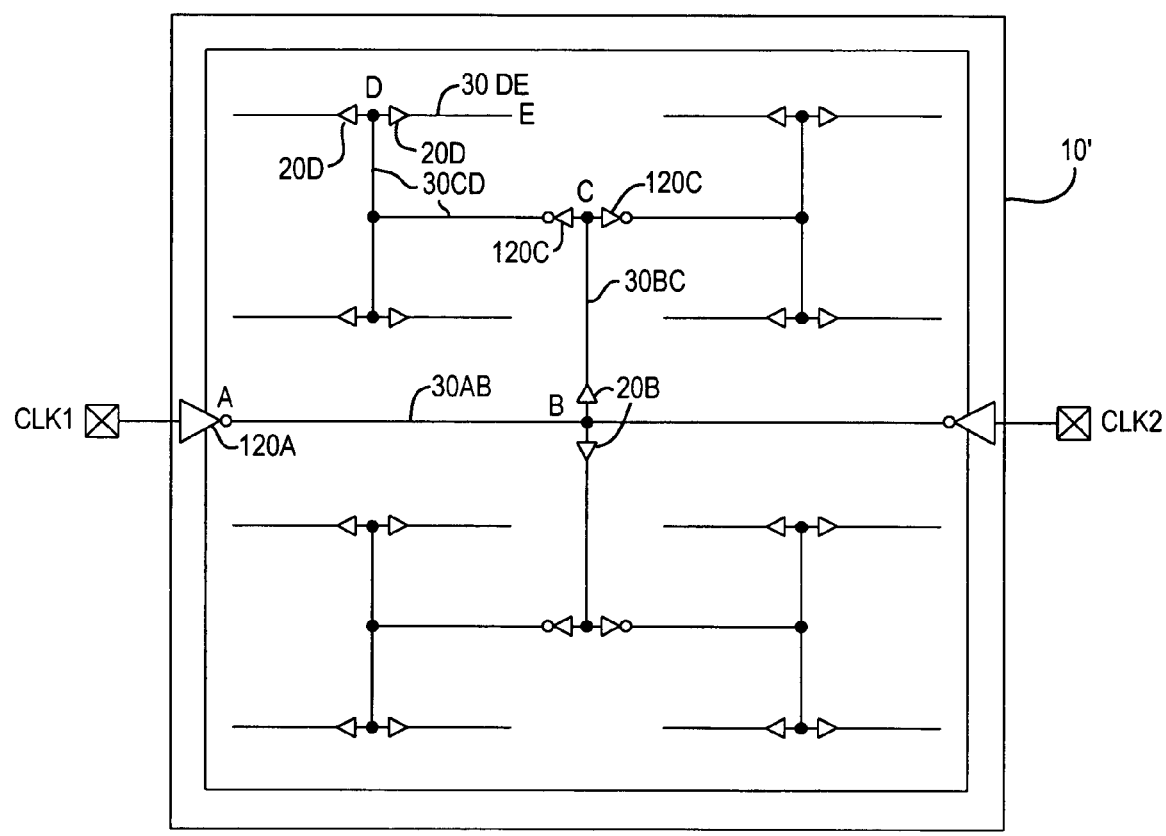
FIG. 4 shows an illustrative modification of the FIG. 1 circuitry in accordance with the invention.

The problems discussed above are addressed in accordance with the invention by using inverting buffers in combination with non-inventing buffers. FIG. 4 shows an example of how circuitry of the type shown in FIG. 1 can be modified in accordance with the invention to include inverting buffers 120A and 120C interspersed among non-inverting buffers 20B and 20D. An illustrative construction of an inverting buffer 120 is shown in FIG. 5 and includes just the first stage 40/42/44 of circuitry like that shown in FIG. 2. Accordingly, inverter 120 inverts the signal applied to it to produce the signal it outputs. Any odd number of serially connected inverter stages can be used to produce an inverting buffer 120.

Figure 6:
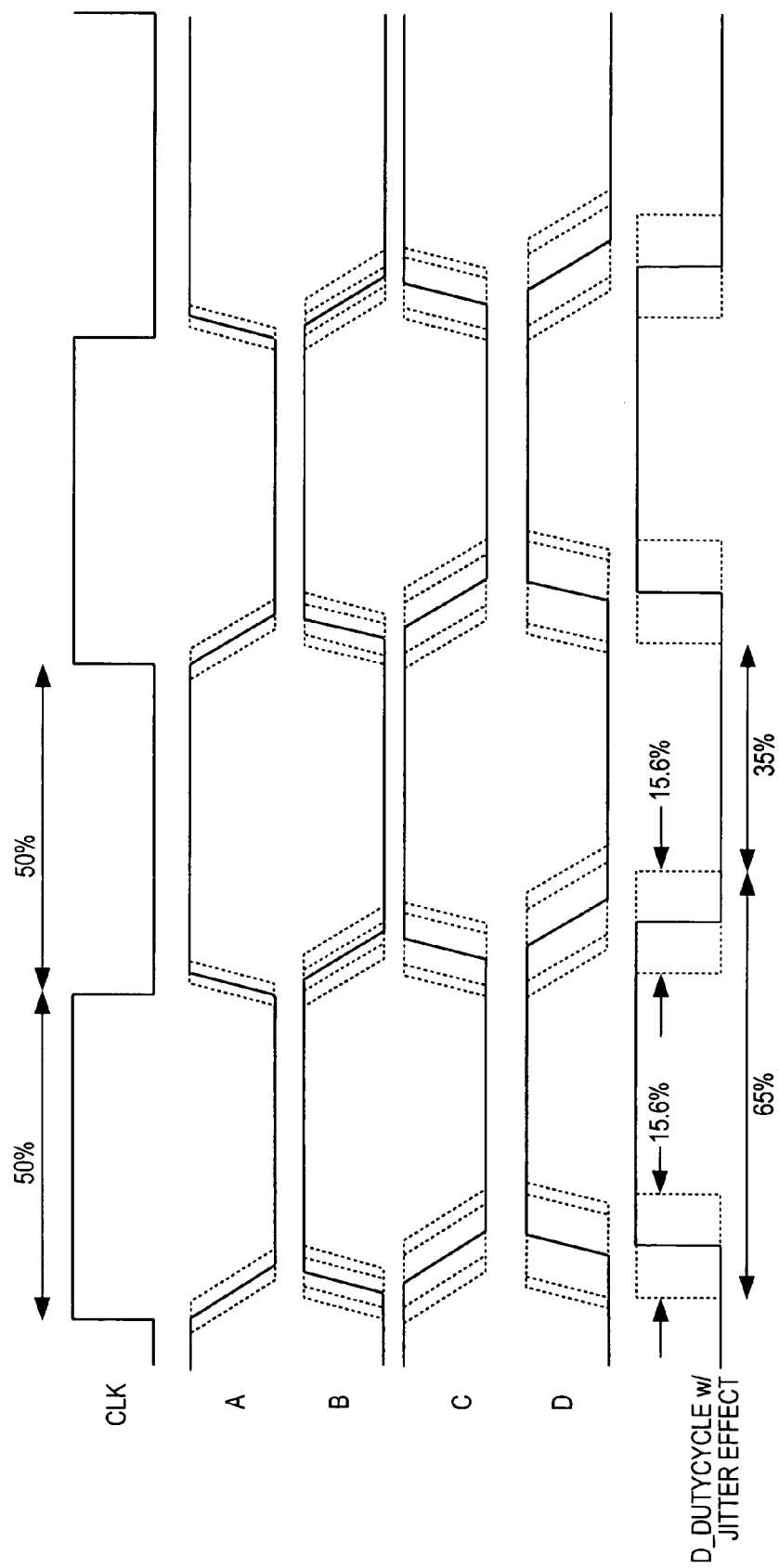
FIG. 6 is similar to FIG. 3 but for signals at various points in the FIG. 4 circuitry.

FIG. 6 shows how signal waveforms similar to those in FIG. 3 are modified as a result of changing the circuitry of FIG. 1 to the configuration shown in FIG. 4. Consistent with FIG. 3, FIG. 6 continues to assume the illustrative case in which Tf for modified circuitry 10' (FIG. 4) is greater than Tr. Considering first only the solid lines in FIG. 6, each relatively slow negative-going transition in the output signal of inverting buffer 120A is followed by a relatively fast positive-going transition in the output signal of the succeeding non-inverting buffers 20B. Similarly, each relatively slow negative-going transition in the output signal of buffers 20B is preceded by a relatively fast positive-going transition in the output signal of buffer 120A. The same pattern of alternating relatively slow negative-going transitions and relatively fast positive-going transitions continues as one proceeds along the clock distribution network from one buffer 20 or 120 to the next buffer 120 or 20 (the inverting and non-inverting buffers alternating with one another as one proceeds along the network). Thus, instead of all the relatively slow negative-going transitions producing one another and thereby accumulating substantially more delay than the relatively fast positive-going transitions produce by their delay accumulation, the invention somewhat averages the effects of unequal Tr and Tf between the rising and falling edges in the original clock signal. This helps reduce the duty cycle distortion that results from passing the clock signal through a succession of buffers having unequal Tr and Tf (compare the last line in FIG. 6 to the last line in FIG. 3, the duty cycle distortion being much less in FIG. 6 than in FIG. 3).

FIG. 6 also shows that the use of interspersed inverting and non-inverting buffers helps ameliorate the unequal effects of jitter (dashed lines in FIG. 6) when Tr and Tf are unequal. Again, the greater jitter associated with the slower transitions is effectively averaged with the lesser jitter associated with the faster transitions. This prevents the greater jitter characteristic from all accumulating in association with one type of transition in the original clock signal. The last line in FIG. 6 shows that the jitter is about equally divided between positive-going and negative-going transitions in the final output clock signal. The worse-case jitter (15.6% of the clock period) is therefore less in FIG. 6 than in FIG. 3 (where it is 19% of the clock period). This reduction in worst jitter is desirable for reasons that have been previously explained.

Although FIG. 4 shows inverting buffers 20 regularly alternating with non-inverting buffers as one progresses along the signal distribution network, this does not have to be the case in all embodiments of the invention. For example, instead of using inverting buffers 120 at locations A and C (as in FIG. 4), inverting buffers could be used at other locations such as A and B, or A and D, or C and D. The objective is for the sum of the delay contributed by Tr and the sum of the delay contributed by Tf in handling one type or polarity of transition in the original clock signal to be approximately equal to the sum of the delay contributed by Tr and the sum of the delay contributed by Tf in handling the other type or polarity of transition in the original clock signal. The arrangement of inverting and non-inverting buffers on the IC should be such that these sums are approximately equal whether Tr=Tf, Tr>Tf, or Tr<Tf.

Although the invention has been illustratively described in the context of its application to a clock signal, the invention is equally applicable to networks for transmitting or distributing other types of signals, non-limiting examples including clock enable signals, reset signals, clear signals, etc.

It will be understood that the foregoing is only illustrative of the principle of the invention, and that various modifications can be made by those skilled in the art without departing from the scope and spirit of the invention. For example, the particular buffer circuits shown are only examples, and other buffer circuit constructions can be used instead, if desired. Assuming that the buffers are implemented from inverter stages, any odd number of serially connected inverter stages can be used to provide an inverting buffer, and any even number of serially connected inverter stages can be used to provide a non-inverting buffer. The number of serially connected buffers in a network constructed in accordance with the invention can be more or less than the number shown in FIG. 4 (i.e., more or less than four). The inverting and non-inverting buffers in such a network do not have to strictly alternate with one another as one progresses along the network (e.g., as in FIG. 4). This last type of possible modification has been elaborated upon elsewhere herein. Although FIG. 3 and FIG. 6 assume that Tr is less than Tf, this is merely an example, and the case in which Tf is less than Tr could have been used as an example instead.

The invention claimed is:

1. Signal transmission circuitry on an integrated circuit comprising:

a plurality of conductor segments that are connected in series by buffer circuits between adjacent ones of the segments in the series, wherein at least one of the buffer circuits is an inverting buffer circuit, and wherein at least one other one of the buffer circuits is a non-inverting buffer circuit, and wherein the inverting and non-inverting buffer circuits between a source of the signal on the circuitry and a destination at which the signal is utilized are arranged so that a sum of buffer rise- and fall-times in propagating a signal transition having a first polarity from the source to the destination is approximately equal to a sum of buffer rise- and fall-times in propagating a signal transition having a second polarity from the source to the destination despite process variations in fabrication of the integrated circuit.

2. The circuitry defined in claim 1 wherein the inverting and non-inverting buffer circuits alternate with one another along the series.

3. The circuitry defined in claim 1 wherein the transmission circuitry is adapted to transmit a clock signal.

4. Clock signal transmission circuitry on an integrated circuit comprising:

a plurality of buffer circuits alternating with conductor segments in a series, at least one of the buffer circuits being an inverting buffer circuit and at least one other of the buffer circuits being a non-inverting buffer circuit, wherein each buffer circuit is characterized by a rise-time Tr and a fall-time Tf for producing rising and falling buffer output signal transitions, respectively, in response to buffer input signal transitions, and wherein a sum of Tr and Tf for all of the buffer circuits for a rising source signal transition propagating through the transmission circuitry is approximately equal to a sum of Tr and Tf for all of the buffer circuits propagating a falling source signal transition through the transmission circuitry, despite possible inequality of Tr and Tf.

5. The circuitry defined in claim 4 wherein the inverting and non-inverting buffer circuits alternate with one another along the series.

6. Clock signal distribution circuitry on a programmable logic device comprising:

a tree of conductor segments emanating from a source location and progressively branching and rebranching from one another at branching locations that are progressively more distant from the source location along the tree; and buffer circuitry connected into the tree adjacent at least some of the branching locations for strengthening the clock signal as it passes through the buffer circuitry, at least some of the buffer circuitry inverting the clock signal passing through it, and at least some other of the buffer circuitry not inverting the clock signal passing through it wherein the clock signal passes through a substantially equal number of inverting and not inverting buffer circuitries in passing from the source location to a destination location at which the clock signal is utilized.

7. The circuitry defined in claim 6 wherein the inverting and not inverting buffer circuitries that the clock signal passes through from the source location to the destination location alternate with one another.

* * * * *